United States Patent
Yu et al.

(10) Patent No.: US 10,554,128 B2
(45) Date of Patent: Feb. 4, 2020

(54) MULTI-LEVEL BOOST CONVERTER

(71) Applicant: Futurewei Technologies, Inc., Plano, TX (US)

(72) Inventors: Bo Yu, Shanghai (CN); Jinxiang Zhan, Shanghai (CN); Dianbo Fu, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/863,002

(22) Filed: Jan. 5, 2018

(65) Prior Publication Data

US 2019/0214904 A1    Jul. 11, 2019

(51) Int. Cl.
| | |
|---|---|
| *H02M 3/158* | (2006.01) |
| *H02M 3/07* | (2006.01) |
| *H02M 1/32* | (2007.01) |
| *H02M 1/36* | (2007.01) |
| *H02M 1/00* | (2006.01) |

(52) U.S. Cl.
CPC ............. *H02M 3/158* (2013.01); *H02M 3/07* (2013.01); *H02M 1/32* (2013.01); *H02M 1/36* (2013.01); *H02M 2001/0048* (2013.01)

(58) Field of Classification Search
CPC . H02M 2001/0048; H02M 2001/0054; H02M 2001/009; H02M 1/32; H02M 1/36; H02M 3/155; H02M 3/156; H02M 3/158
See application file for complete search history.

(56) References Cited

U.S. PATENT DOCUMENTS

| | | | |
|---|---|---|---|
| 10,075,080 B1* | 9/2018 | Scoones | H02M 3/1588 |
| 2010/0289423 A1* | 11/2010 | Yao | H05B 41/2825 |
| | | | 315/246 |
| 2013/0301314 A1* | 11/2013 | Fu | H02M 7/487 |
| | | | 363/37 |
| 2015/0097546 A1* | 4/2015 | Pan | H02M 3/158 |
| | | | 323/311 |
| 2015/0188362 A1* | 7/2015 | Mondal | H02M 3/156 |
| | | | 307/52 |
| 2015/0244259 A1* | 8/2015 | Kaiser | H02M 3/158 |
| | | | 307/9.1 |
| 2016/0226372 A1* | 8/2016 | Willenberg | H02M 1/34 |

(Continued)

FOREIGN PATENT DOCUMENTS

| | | |
|---|---|---|
| CN | 102354483 A | 2/2012 |
| CN | 103346672 A | 10/2013 |
| CN | 103490625 A | 1/2014 |

OTHER PUBLICATIONS

International Search Report dated Apr. 3, 2019, in PCT Application No. PCT/CN2019/070385, 11 pages.

*Primary Examiner* — Fred E Finch, III
(74) *Attorney, Agent, or Firm* — Vierra Magen Marcus LLP (57) ABSTRACT

A DC to DC converter uses a multi-level boost converter topology. In addition to the input voltage being connected to an output node through a boost inductor in series with a pair of diodes, a bridge circuit generates a multi-level waveform on one side of flying capacitor, which is on the other side connected between the series connected diodes. The boost converter topology maintains low voltage stress on its components under abnormal conditions on the output node and allows for simple pre-charging of the flying capacitor.

20 Claims, 10 Drawing Sheets

(56) References Cited

U.S. PATENT DOCUMENTS

| | | | |
|---|---|---|---|
| 2016/0241073 A1* | 8/2016 | Hatakeyama | H02M 1/12 |
| 2016/0285371 A1* | 9/2016 | Fu | H02M 3/158 |
| 2017/0005576 A1* | 1/2017 | Petersen | H02M 3/158 |
| 2017/0126120 A1* | 5/2017 | Chakraborty | H02M 3/158 |
| 2017/0271873 A1* | 9/2017 | Huang | H02M 3/07 |
| 2017/0302093 A1* | 10/2017 | Petersen | H02J 7/0029 |
| 2017/0324321 A1* | 11/2017 | Hoyerby | H02M 1/088 |
| 2017/0331367 A1* | 11/2017 | Kubouchi | H02M 3/158 |
| 2017/0331374 A1* | 11/2017 | Hoyerby | H02M 3/07 |
| 2018/0175726 A1* | 6/2018 | Petersen | H02M 3/07 |
| 2018/0316258 A1* | 11/2018 | Fu | H02M 3/158 |

* cited by examiner

MULTI-LEVEL BOOST CONVERTER

BACKGROUND

The following is related generally to the field of DC to DC converters and, more specifically, to boost converters.

PRIOR ART

Figure 1:
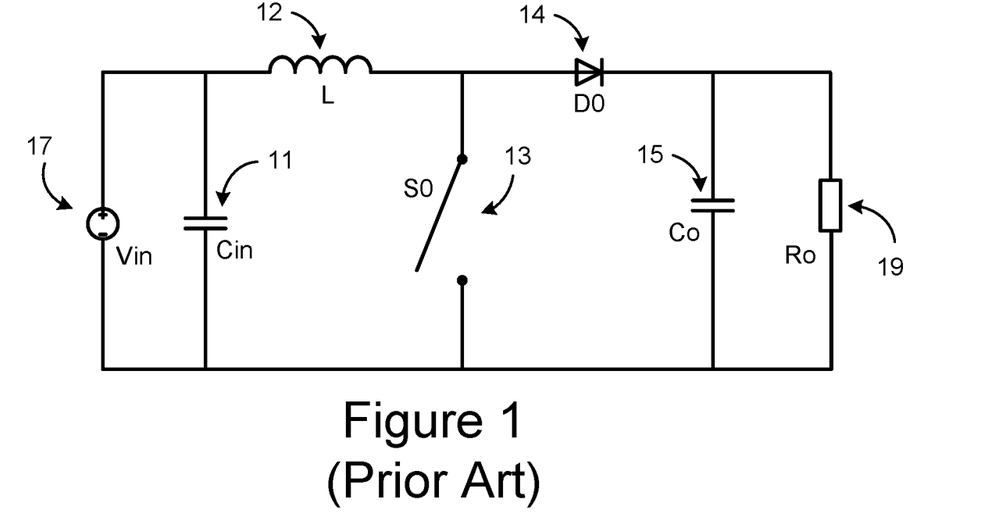
FIG. 1 shows a prior art example of a boost converter.

Boost converters are a type of DC to DC electric power converter that generate an output voltage higher than the input voltage, at the cost of a lower current level. FIG. 1 shows an example of a boost converter.

In this example, the input voltage source Vin 17 is connected to the ground or low voltage rail at the − terminal and connected to the load at the + terminal, represented by the resistor Ro 19, through the series combination of an inductor L 12 and a diode D0 14. An output capacitor Co 15 is connected between the output node at Vo and ground, in parallel with the load Ro 19, and an input capacitor Cin 11 is connected between the input and ground, in parallel with the voltage source Vin 17. A switch S0 13 is connected on the one side to a node between the inductor L 12 and the diode D0 14, and on the other side to ground. The switch is typically implemented as a metal-oxide-semiconductor field-effect transistor (MOSFET), insulated-gate bipolar transistor (IGBT), or bipolar junction transistor (bipolar transistor or BJT).

When the switch S0 13 is in the on state and closed, the current path from Vin 17 is through S0 13 to ground and the current though the inductor L 12 increases. When the switch S0 13 is in the off state and open, the only path available to the current is through the diode D0 14 and on to the capacitor Co 15 and resistor Ro 19. This results in the energy accumulated while S0 13 was on being transferred into the capacitor Co 15. When the switch S0 13 is turned back off, the diode D0 14 prevents the current flowing back in the other direction towards boost inductor L 12. When the converter is operated in a continuous mode, with the switch be alternately opened and closed, this results in the output voltage Vo applied to the load Ro 19 having a higher value than Vin, but with the current level being lower. By varying the period of the switching or duty cycle (the fraction of the period during which S0 13 is on), the ratio of Vo to Vin can be varied, with the shorter the duty cycle, the higher the ratio of Vo/Vin.

When S0 13 is on, the diode D0 14 needs to be able to support the full Vo value. In high voltage applications, such as where Vin is from a photovoltaic converter and the output may be to supply an electrical grid, Vin may range over 200-1000V and Vo may be up to 1200V, for example. Consequently, the diode D0 14 may need to support 1200V. Although 1200V diodes that can handle the needed current and voltage levels are available, they are costly and have a number disadvantages. In the case of a 1200V silicon diode, such devices show poor reverse recovery performance, allowing revers current flow and reducing efficiency. In the case of a 1200V silicon carbide (SiC), the diode provides almost zero reverse recover, but has a high forward voltage drop.

SUMMARY

According to one aspect of the present disclosure, there is provided an apparatus that includes a DC to DC voltage converter having an input voltage node configured to receive an input voltage, an output voltage node configured to provide an output voltage, and an inductor is connected between the input node and the output node. First and second diodes are connected in series between the inductor and the output node and are configured to allow current to flow from the inductor to the output voltage node. A first capacitor has a first plate and a second plate, the first plate connected to a node between the first and second diodes, and the second plate connected to an internal node. A third diode is connected between the internal node and an intermediate voltage node and is configured to allow current to flow from the internal node to the intermediate voltage node. A first switch is connected between the internal node and a node between the inductor and the second and third diodes; and a second switch is connected between the internal node and ground, where the first and second switches configured to generate a multi-level waveform on the internal node.

Optionally, in the preceding aspect, another implementation of the aspect provides that the DC to DC converter further comprises a fourth diode connected in parallel with first and second diodes between the inductor and the output node, configured to allow current to flow from the inductor to the output voltage node.

Optionally, in the preceding aspects, another implementation of the aspects provides that the DC to DC converter further comprises a third switch through which the second plate of the first capacitor is connected to the internal node.

Optionally, in the preceding aspects, another implementation of the aspects provides that the DC to DC converter further comprises a second capacitor connected between the output node and the intermediate voltage node and a third capacitor connected between the intermediate voltage node and ground.

Optionally, in the preceding aspects, other implementations of the aspects provide that the first and second switches are NMOS transistors.

Optionally, in the preceding aspects, another implementation of the aspects provides that the DC to DC converter further comprises a control circuit configured to provide first and second non-overlapping control waveforms to the first and second switches, respectively.

Optionally, in the preceding aspect, another implementation of the aspects provides that the control circuit is further configured receive the output voltage and vary a duty cycle of the first and second control waveforms to regulate the level of the output voltage.

Optionally, in preceding aspects, another implementation of the aspects provides that the DC to DC converter further comprises a third switch through which the second plate of the first capacitor is connected to the internal node, wherein the control circuit configured is to turn the third switch on while concurrently providing the first and second non-overlapping control waveforms to the first and second switches.

Optionally, in the preceding aspect, another implementation of the aspects provides that the control circuit is further configured to perform a pre-charge operation that includes concurrently turning off the first, second and third switches.

According to another aspect of the present disclosure, there is provided a system that includes a DC to DC voltage conversion system, comprising a DC to DC conversion circuit and a control circuit. The DC to DC conversion circuit includes an inductor connected between an input node and an output node; and first and second diodes connected in series between the inductor and the output node, the first and second diodes being configured to allow current to flow from the inductor to the output node. A bridge circuit is connected between a node connecting the inductor to the first and second diodes and ground, where the bridge circuit is configured to generate a multi-level waveform on an internal node. The DC to DC conversion circuit further includes a capacitor having a first plate and a second plate, where the first plate connected to a node between the first and second diodes and the second plate connected to the internal node. A third diode is connected between the internal node and an intermediate voltage node and is configured to allow current to flow from the internal node to the intermediate voltage node. The control circuit is connected to the bridge circuit and is configured to supply the bridge circuit first and second non-overlapping control waveforms whereby an output voltage is generated at the output node from an input voltage at the input node.

Optionally, in the preceding aspect, another implementation of the aspect provides that the bridge circuit includes a first switch and a second switch. The first switch is connected between the internal node and the node connecting the inductor to the first and second diodes and is configured to receive the first control waveform. The second switch is connected between the internal node and ground and is configured to receive the second control waveform.

Optionally, in the preceding aspects, another implementation of the aspects provides that the DC to DC converter further comprises a fourth diode connected in parallel with first and second diodes between the inductor and the output node, configured to allow current to flow from the inductor to the output node.

Optionally, in the preceding aspects, another implementation of the aspects provides that the control circuit is further configured receive the output voltage and vary a duty cycle of the first and second control waveforms to regulate the level of the output voltage.

Optionally, in the preceding aspects, another implementation of the aspects provides that the control circuit is further configured to perform a pre-charge operation that includes concurrently turning off the first, second and third switches.

According to an additional aspect of the present disclosure, there is provided a method that includes receiving an input voltage at an input node and generating from the input voltage an output voltage at an output node. Generating the output voltage includes generating first and second non-overlapping control waveforms. The first and second non-overlapping waveforms and applied to a bridge circuit and generating by the bridge circuit generates from the first and second non-overlapping waveforms a multi-state waveform at an internal node of a DC to DC voltage converter. The DC to DC voltage converter includes: an inductor connected between the input node and the output node; first and second diodes connected in series between the inductor and the output node, configured to allow current to flow from the inductor to the output voltage node; a first capacitor having a first plate and a second plate, the first plate connected to a node between the first and second diodes and the second plate connected to the internal node; and a third diode connected between the internal node and an intermediate voltage node, configured to allow current to flow from the internal node to the intermediate voltage node, where the bridge circuit is connected between a node connecting the inductor to the first and second diodes and ground.

Optionally, in the preceding aspect, another implementation of the aspect provides that generating the output voltage at the output node further includes varying a duty cycle of the first and second non-overlapping control waveforms to regulate the output voltage.

Optionally, in the preceding aspects, another implementation of the aspects provides that the bridge circuit includes a first switch and a second switch. The first switch is connected between the internal node and the node connecting the inductor to the first and second diodes, and is configured to receive the first control waveform. The second switch is connected between the internal node and ground, and is configured to receive the second control waveform.

Optionally, in the preceding aspects, another implementation of the aspects provides that the DC to DC voltage converter further includes a third switch through which the second plate of the capacitor is connected to the internal node. Prior to generating the output voltage at the output node, a pre-charge operation is performed, which includes receiving the input voltage at the input node while setting the first, second and third switches off.

Optionally, in the preceding aspect, another implementation of the aspects provides that generating the output voltage at the output node further includes setting the third switch on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The following presents examples of boost converters with multi-level operation, placing components under lower stress voltages and allowing use of a smaller boost inductor. The boost inductor is connected to the output through a pair of series connected diodes, with a flying capacitor connected between the diodes on one side and to a multi-state waveform generated by a bridge circuit on an internal node on the other side. The internal node is connected to a capacitive voltage divider through a diode to protect the circuit from voltage surges on the output node. The boost convert includes a pre-charge path for the flying capacitor. In parallel with the series connected diodes, another diode is connected in parallel to reduce conduction loses.

The embodiments of multi-level boost converters presented can be used across a wide range of voltage levels, including for high voltage levels. For example, they can be applied to power supply systems requiring a regulated output voltage level, such as where the input voltage is from a photovoltaic converters of a solar power system with a range of 200-1000 volts and the output is to a power grid of 480-1200 volts. Other examples can include battery charging circuits with input and output voltages that can be in the range of several hundred voltages, such a battery charger for use with an electrical vehicle. These applications are by way of example only, and it is understood that the multi-level hybrid converter of the present technology may be used in other applications.

Figure 2A:
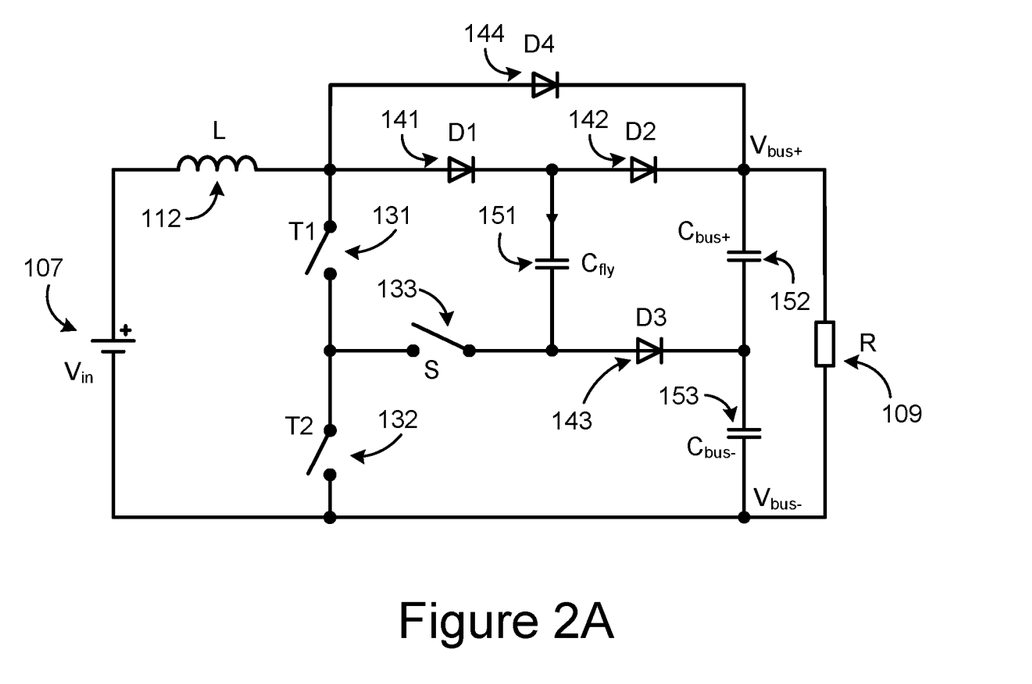
FIG. 2A presents one embodiment for a multi-level boost converter circuit.

FIG. 2A presents one embodiment for a multi-level boost converter circuit 100. In this example of the multi-level boost converter circuit 100, an input voltage source Vin 107 is connected between ground (or, more generally, the lower bus voltage level $V_{bus-}$) and the boost inductor L 112. The boost inductor L 112 is connected to the output node at upper bus voltage level $V_{bus+}$ through a pair of series connected diodes D1 141 and D2 142 oriented to allow current to flow from the inductor L 112 to the $V_{bus+}$ node. A load is represented at R 109 and is connected between $V_{bus+}$ and $V_{bus-}$. For example, the input voltage can be a photovoltaic converter at 200V and $V_{bus+}$ and $V_{bus-}$ the high and ground lines of a power grid at 480V.

A flying capacitor $C_{fly}$ 151 has one plate connected to a node between the diodes D1 141 and D2 142 and its second plate connected to an internal node X. The internal node X is connected on the one side between the capacitors $C_{bus+}$ 152 and $C_{bus-}$ 153, and on the other side between the switches T1 131 and T2 132. The capacitors $C_{bus+}$ 152 and $C_{bus-}$ 153 are connected in series between $V_{bus+}$ and $V_{bus-}$ to form a capacitive voltage divider. In one set of embodiments, capacitors $C_{bus+}$ 152 and $C_{bus-}$ 153 are taken to have the same capacitance so that the level on the node between capacitors $C_{bus+}$ 152 and $C_{bus-}$ 153 will be at ½ $V_{bus+}$.

A bridge circuit formed of switches T1 131 and T2 132 is connected between the boost inductor L 112 and the series diodes D1 141, D2 142 on the one side and ground on the other side, and can be used to generate a multi-level waveform on the node X when the switch S 133 is closed. (Switch S 133 will be discussed further below with respect to pre-charging.) Depending on the embodiment, the switches T1 131, T2 132 and S 133 can be implemented as a metal-oxide-semiconductor field-effect transistor (MOSFET), insulated-gate bipolar transistor (IGBT), bipolar junction transistor (bipolar transistor or BJT) or other active controlled power semiconductor. For example, FIG. 2E illustrates a high voltage NMOS device and FIG. 2F illustrates a high voltage IGBT, as can be used for T1 131, T2 132 and S 133, where the shown diode is the device's inherent body diode, rather than a separate element. The control voltage for the device $V_T$ is applied to the control gate of the device and corresponds to $V_{T1}$, $V_{T2}$ and $V_S$ for the respective cases of T1 131, T2 132 and S 133.

When switch T1 131 is on (closed) and switch T2 132 is off (open), the node X will be at $V_{in}$; where switch T1 131 is off (open) and switch T2 132 is on (closed), the node X will be at ground; and when both switches T1 131 and T2 132 are off, the node X will be at ½ $V_{bus+}$. This results in a multi-level waveform on the node X. The switches T1 131 and T2 132 have non-overlapping control waveforms so that the switches T1 131 and T2 132 are not both on at the same time. Because of this, the elements L 112, D1 141, D2 142, T1 131 and T2 132 do not need to support the either of the full value of $V_{in}$ or $V_{bus+}$, so that these elements have lower levels of voltage stress than the elements of the sort of topology illustrated in FIG. 1. For example, T2 132 never sees a voltage larger than ½ $V_{bus+}$. This allows use of a smaller size boost inductor L 112 and also smaller, less expensive devices for these other elements as they see relatively lower voltages across them.

Embodiments of the multi-level boost converter can include the switch S 133, through which the bottom plate at node X of the Cfly 151 is connected to the node between the switches T1 131 and T2 132. During normal operation, when $V_{bus+}$ is being generated from Vin 107, S 133 is closed (on), but can be opened (off) to improve start-up operation by providing a pre-charge path for $C_{fly}$ 151, without the introduction of extra pre-charge circuitry, as described further with respect to FIG. 5.

Embodiments of the multi-level boost converter can also include the diode D3 143, through which the bottom plate of the Cfly 151 at node X is connected to the intermediate node of the capacitive voltage divider of $C_{bus+}$ 152 and $C_{bus-}$ 153. This can help to prevent voltage surges at $V_{bus+}$ being transmitted to $C_{fly}$ 151. For example, if $V_{bus+}$ and $V_{bus-}$ are the high and low lines of a power grid, this inclusion of D3 143 can help prevent such power surges from being transmitted back to the boost converter 100 and causing damage to its components, as described further with respect to FIGS. 4A and 4B.

Embodiments of the multi-level boost converter can also include the diode can also include the diode D4 144 connected in parallel with the series connected diodes D1 141 and D2 142. The diode D4 144 provides an additional current path from the boost inductor 112 to the output node providing $V_{bus+}$. The additional path through D4 144 will have lower conduction losses than the path through D1 141 and D2 142, as discussed further with respect to FIGS. 3A-3D. Other embodiments may not include the path with diode D4 144, as is discussed below with respect to FIGS. 6A-6D.

Figure 2B:
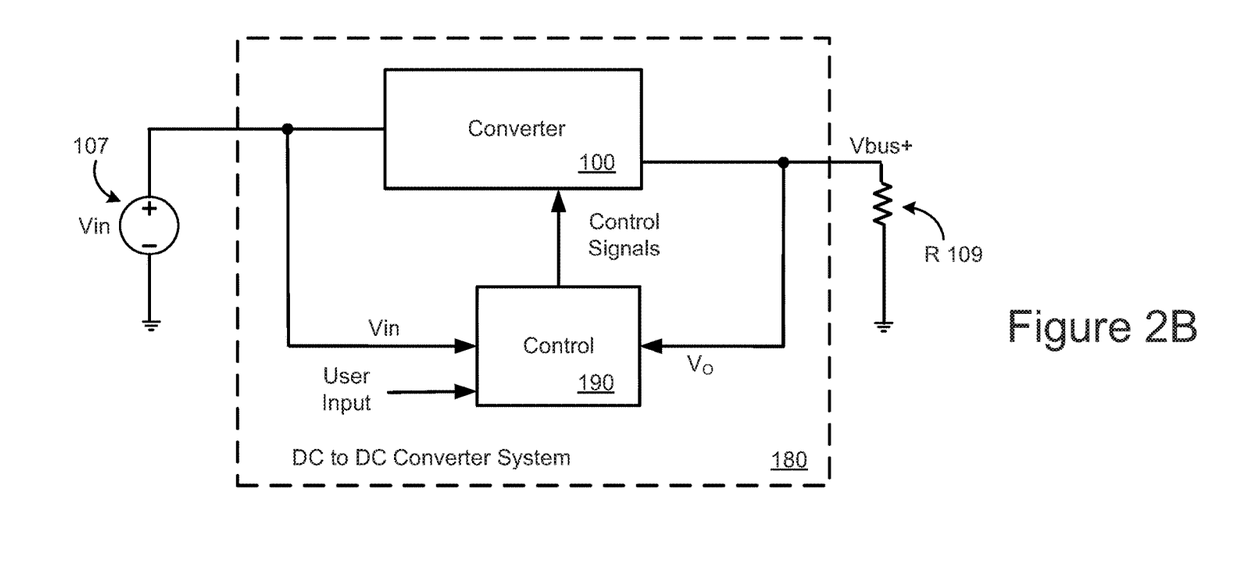
FIG. 2B shows an embodiment of a DC to DC converter system including a multi-level boost converter circuit, such as illustrated with respect to FIG. 2A.

FIG. 2B shows an embodiment of a DC to DC converter system 180, including a control block 190 as well as a multi-level boost converter circuit 100, such as illustrated with respect to FIG. 2A. The converter 100 is connected to a voltage source Vin 107 and generates an output voltage $V_{bus+}$ that can be connected to drive a resistive load R 109. The multi-level boost converter 100 is connected to receive a set of control signals from the control block 190 that can be used to regulate the output voltage $V_{bus+}$. The circuit of the control block 190 can be connected to receive the output voltage $V_{bus+}$ and, in some embodiments the input voltage Vin, to regulate the output level $V_{bus+}$ based on its level or on the ratio of $V_{bus+}$/Vin. The control block 190 can be adjusted, such as based on user input, to generate control signals that the multi-level boost converter uses to regulate the output voltage level.

Figure 2C:
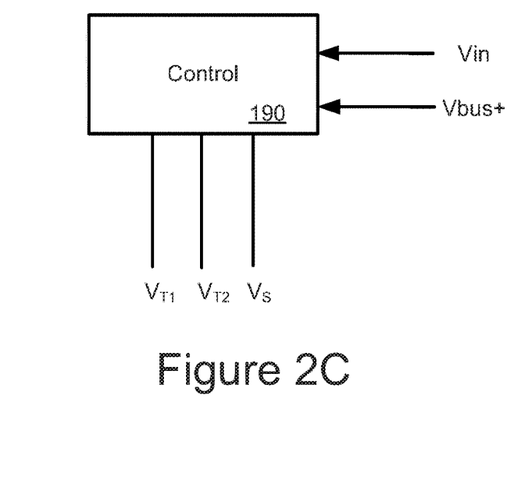
FIG. 2C is a block diagram of a control circuit block to provide the switching waveforms for the DC to DC converter system of FIG. 2B.

FIG. 2C is a block diagram of an embodiment for control circuit block 190 to provide the switching waveforms for controlling the switches T1 131, T2 132 and S 133 for DC to DC converter system 180 of FIG. 2B. Depending on the embodiment, the control circuitry can be implemented through hardware, software, firmware, or some combination of these. In some embodiments, the switches T1 131, T2 132 and S 133 can be implemented as: MOSFETs, as illustrated by the NMOS device in FIG. 2E; insulated-gate bipolar transistor (IGBT), as illustrated in FIG. 2F; bipolar junction transistor (bipolar transistor or BJT); or other active controlled power semiconductor. The control signal waveforms $V_{T1}$, $V_{T2}$ and $V_S$ are applied to the control gates of the corresponding switches, as represented in FIG. 2E or 2F. During operation to generate $V_{bus+}$, the controller signal for $V_S$ is high so that S 133 is on and the control signals for $V_{T1}$ and $V_{T2}$ are non-overlapping waveforms to generate the multi-level waveform on node X and generate $V_{bus+}$. During pre-charge mode, $V_{T1}$ and $V_{T2}$ are low so that T1 131 and T2 132 are off and $V_S$ is high low that S 133 is off, as discussed further below with respect to FIG. 5.

Figure 2D:
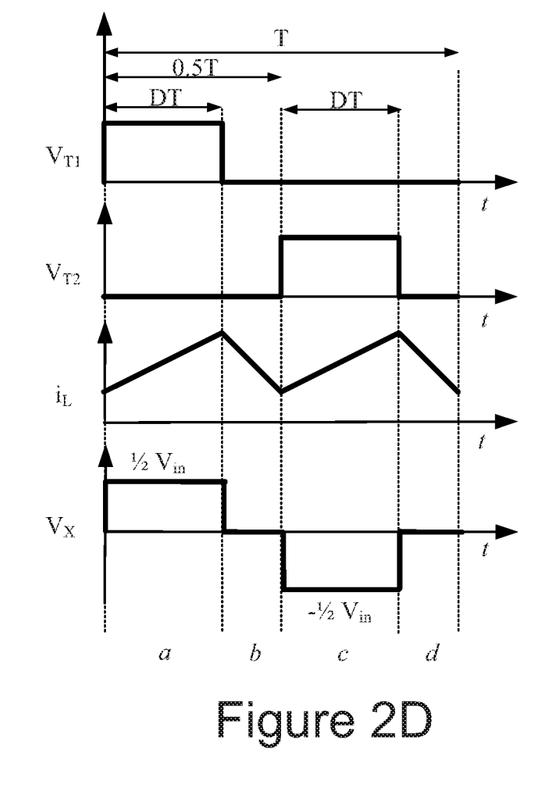
FIG. 2D illustrates a set of waveforms for the DC to DC conversion system 2B with the multi-state boost converter of FIG. 2A.
Figure 2E:
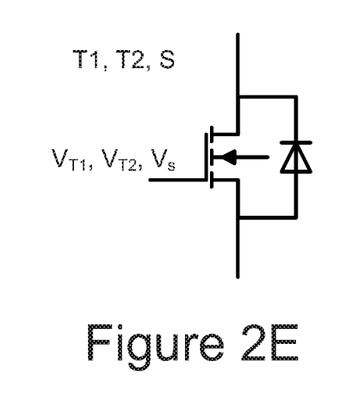
FIGS. 2E and 2F respectively illustrate a high voltage NMOS device and a high voltage insulated-gate bipolar transistor as can be used for switches of FIG. 2A.
Figure 2F:
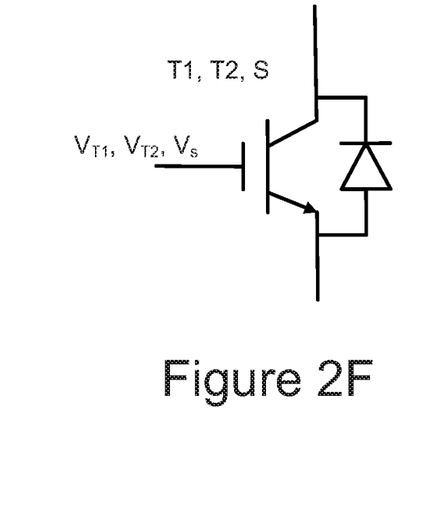

FIG. 2D illustrates a set of waveforms for the DC to DC conversion system 2B with the multi-state boost converter of FIG. 2A. At top are a set of control waveforms $V_{T1}$ and $V_{T2}$ as generated by the control circuit 190 of FIG. 2C according to one set of embodiments. $V_{T1}$ and $V_{T2}$ are non-overlapping waveforms having a period T, where in this representation $V_{T1}$ is high in the first half cycle and $V_{T2}$ is high in the second half cycle. In this example, both of $V_{T1}$ and $V_{T2}$ are symmetric, having the same duty cycle DT. During operation, when $V_{bus+}$ is being generated from Vin, switch S 133 is on and $V_S$ is correspondingly kept high and is not shown in FIG. 2D. Below the $V_{T1}$ and $V_{T2}$ control waveforms is the current $i_L$ through the boost inductor L 112 and the voltage $V_X$ generated by the bridge circuit of T1 131, T2 132 at the internal node X. The different phases a, b, c and d are marked at bottom and respectively correspond to when: $V_{T1}$ is high and $V_{T2}$ is low; $V_{T1}$ and $V_{T2}$ are both low; $V_{T1}$ is low and $V_{T2}$ is high; and $V_{T1}$ and $V_{T2}$ are both low. The configuration of the multi-level boost converter of FIG. 2A at these phases a, b, c and d are respectively represented in FIG. 3A-3D.

FIGS. 3A-3D show the boost circuit of the embodiment of FIG. 2A with the switches T1 131 and T2 132 configured according to the control signals of control circuit of FIG. 2C at phases a-d of FIG. 2D, respectively. In FIGS. 3A-3D, and also in FIGS. 4A, 4B and 5, the more relevant circuit paths are represented by a heavier line weight.

Figure 3A:
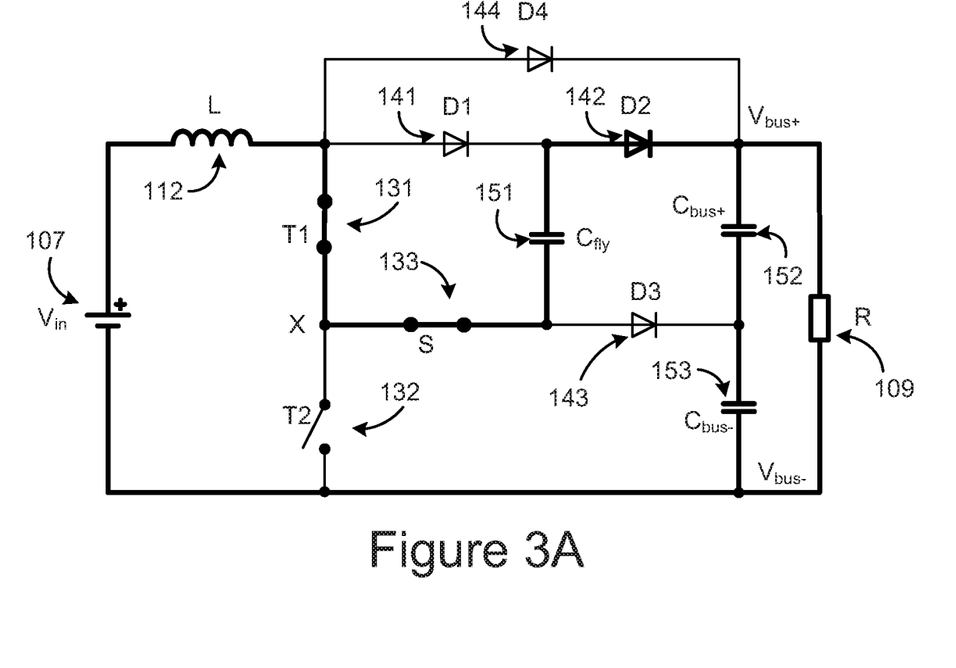
FIGS. 3A-3D illustrate the multi-level boost converter of FIG. 2A at the respective phases a-d of FIG. 2D.
Figure 3B:
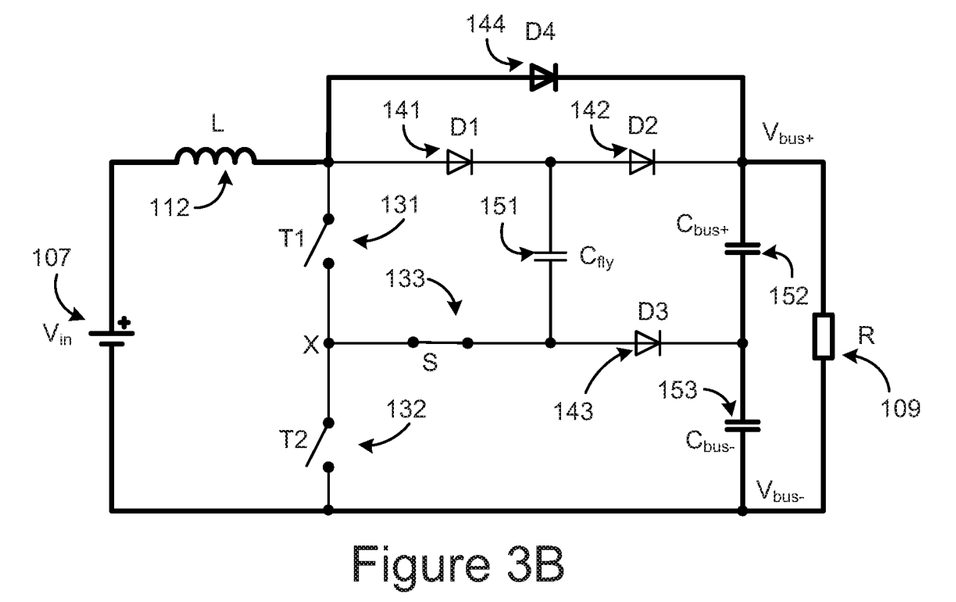

In FIG. 3A, corresponding to phase a of FIG. 2D, switch T1 131 is closed and switch T2 132 is open. The current through $i_L$ through L 112 is rising and flows through T1 131 to the internal node X. Node X is at Vin and the main current flow is through D2 142 to the output node at $V_{bus+}$. FIG. 3B corresponds to phase b of FIG. 2D, with both of switches T1 131 and T2 132 are off. The node X is at ½ $V_{bus+}$. The current $i_L$ continues to flow through L 112 continues to flow, but is decreasing, and can flow though the series connected diodes D1 141 and D2 142 or through the diode D4 144 connected in parallel with D1 141 and D2 142. The path through the single diode D4 144 will have a lower voltage drop and be the main current path for $i_L$ to the load. The inclusion of the single diode path through D4 144 will consequently reduce conduction losses.

Figure 3C:
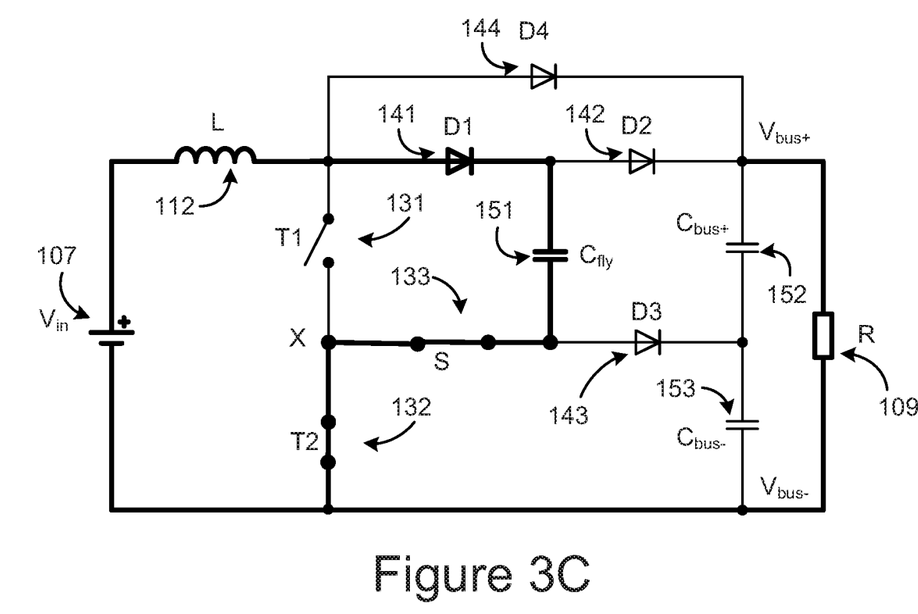
Figure 3D:
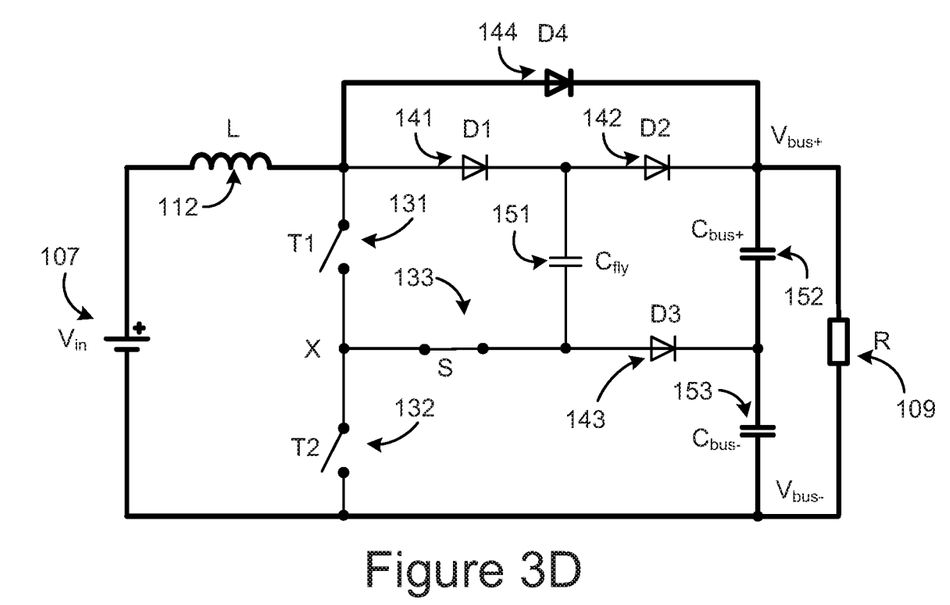

In FIG. 3C, corresponding to phase c of FIG. 2D, switch T1 131 is open and switch T2 132 is closed. The node X is consequently connected to the $V_{bus-}$ line and at ground. The current $i_L$ is again rising and the current flows through D1 141 to charge the top plate of $C_{fly}$ 151. FIG. 3D corresponds to phase d of FIG. 2D, with both of switches T1 131 and T2 132 are again off and the node X is at ½ $V_{bus+}$. As in FIG. 3B, the main current flow is again through the single diode D4 144, reducing conduction losses. The system then returns to phase a, raising the node X back to Vin.

The control circuit can regulate the output $V_{bus+}$ by varying the duty cycle D, the period T, or both. As the duty cycle is increased to 50% for each of $V_{T1}$ and $V_{T2}$, $V_{bus+}$ becomes Vin. As the duty cycle decreases, $V_{bus+}$ increases, but at a lower current. This allows the control circuit 190 of FIGS. 2B and 2C to regulate the output of the boost converter, where, depending on the embodiment, the $V_{bus+}$ level can be regulated based on user input or regulated automatically.

Figure 4A:
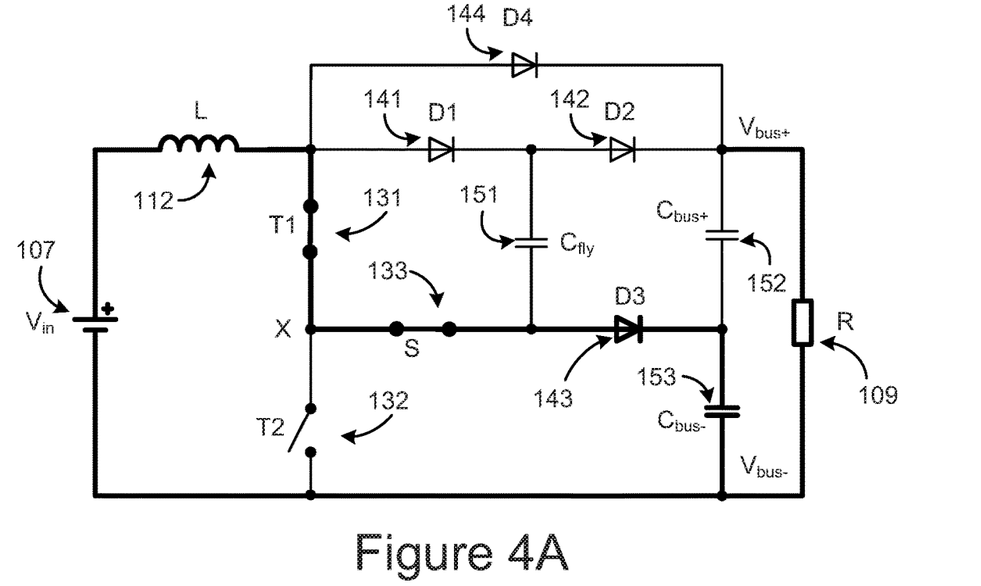
FIGS. 4A and 4B illustrate the voltage clamping behavior of the multi-level boost converter of FIG. 2A in response an abnormal grid interaction.
Figure 4B:
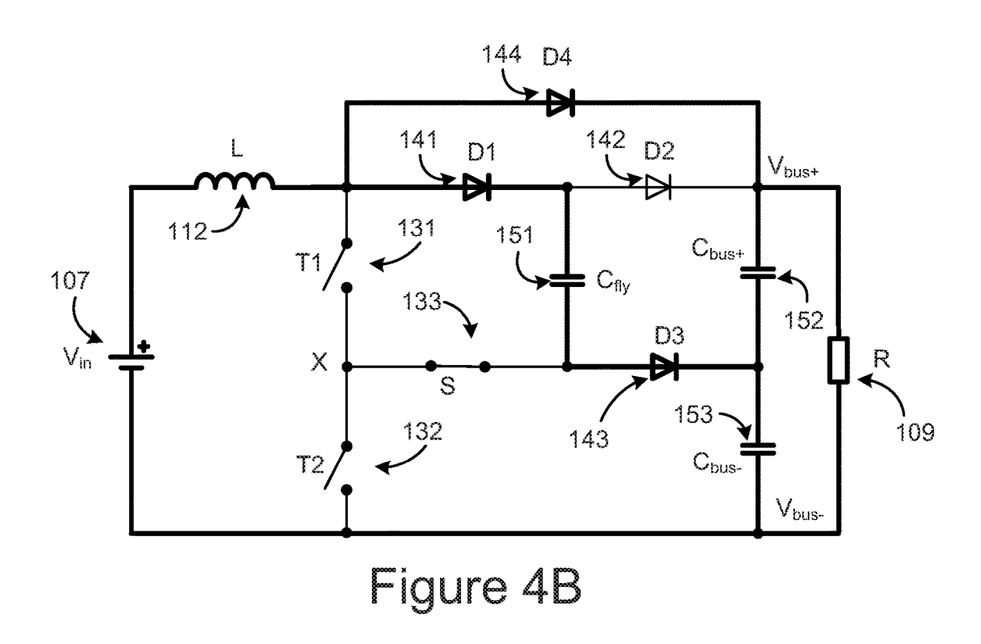

FIGS. 4A and 4B illustrate the voltage clamping behavior of the multi-level boost converter of FIG. 2A in response to a sharp voltage increase at the $V_{bus+}$ output node. For example, if the circuit of FIG. 2B is used to supply an electrical grid and there is a lightning strike or some other accident causing a spike on the grid, this could feed back into the elements of the converter and damage the circuit. Without the diode D3 143, if $V_{bus+}$ increases sharply, the voltage of $C_{fly}$ 143 cannot follow up timely, so that T2 132 might suffer an over-voltage stress. By including diode D3 143, the maximum voltage stress of T2 132 is clamped at ½ $V_{bus+}$, and the voltage on $C_{fly}$ 151 can follow up this amount of increase. This is illustrated in FIGS. 4A and 4B.

FIG. 4A illustrates the multi-state boost converter configured as in phase a of FIG. 2D, with T1 131 (and S 133) closed and T2 132 open. Without D3 in place, a voltage surge on the grid could feed through to node X on the lower plate of $C_{fly}$ 151, raising the level at node X abruptly and placing a large stress across T2 132 and L 112. Including D3 clamps node X at ½$V_{bus+}$ for the regulated value of $V_{bus+}$, keeping any spike on the grid from node X. FIG. 4B illustrates the multi-state boost converter configured as in phases b and d of FIG. 2D, with both T1 131 and T2 132 open. The diode D3 143 again keeps any spike from the node X, which is clamped at ½$V_{bus+}$ for the regulated value of $V_{bus+}$. The diodes D1 141 and D4 144 prevent any sharp increases at $V_{bus+}$ from feeding back along the parallel paths from $V_{bus+}$ to L 122 along the top of the figure. Consequently, the inclusion of D3 143 can provide a very reliable solution for abnormal grid interactions.

In topologies with a flying capacitor, such as $C_{fly}$ 151 of FIG. 2A, pre-charging the flying capacitor at start up is typically a problem. In the discussion above of normal operation, the switch S 133 has been closed and has not entered the discussion. However, the inclusion of the switch S 133 provides a simple solution to pre-charge $C_{fly}$ 151.

Figure 5:
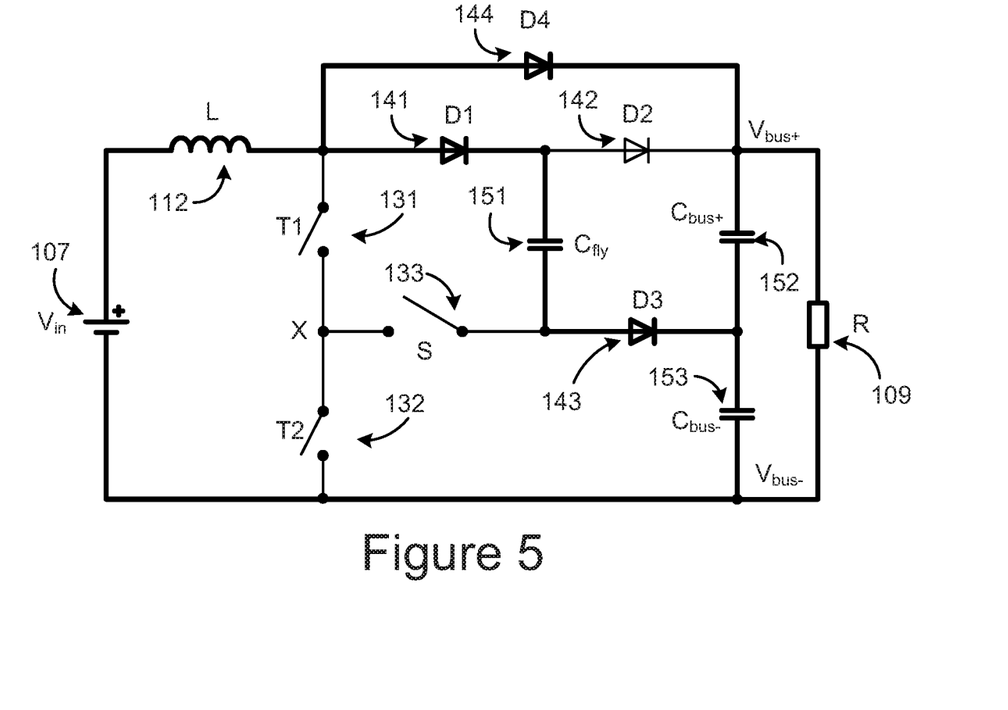
FIG. 5 illustrates a pre-charge operation for FIG. 2A.

FIG. 5 illustrates the multi-state boost converter configured for a pre-charge operation, such as could be done for a few milliseconds, for example, to initialize the circuit before beginning normal operation. Switch S 133 as well as switches T1 131 and T2 132 are open. This allows current to flow through the boost inductor L 112 through D1 141 and on to the top plate of $C_{fly}$ 151 setting it at Vin and pulling up the node X. As the current can also flow through D4 144 to the output node, this will also initialize the voltage divider of $C_{bus+}$ 152 and $C_{bus-}$ 153. This allows for circuit to be pre-charged without the cost and complexity of special pre-charging elements.

The embodiment of FIG. 2A include the switch S 133, which can be used in the pre-charge process described with respect to FIG. 5, and the path with diode D4 144, connected in parallel with series connected diodes D1 141 and D2 142, as well at the diode D3 143. Alternate embodiments can omit one or combinations of these elements. For example, FIG. 6A illustrates an alternate embodiment without the D4 144.

Figure 6A:
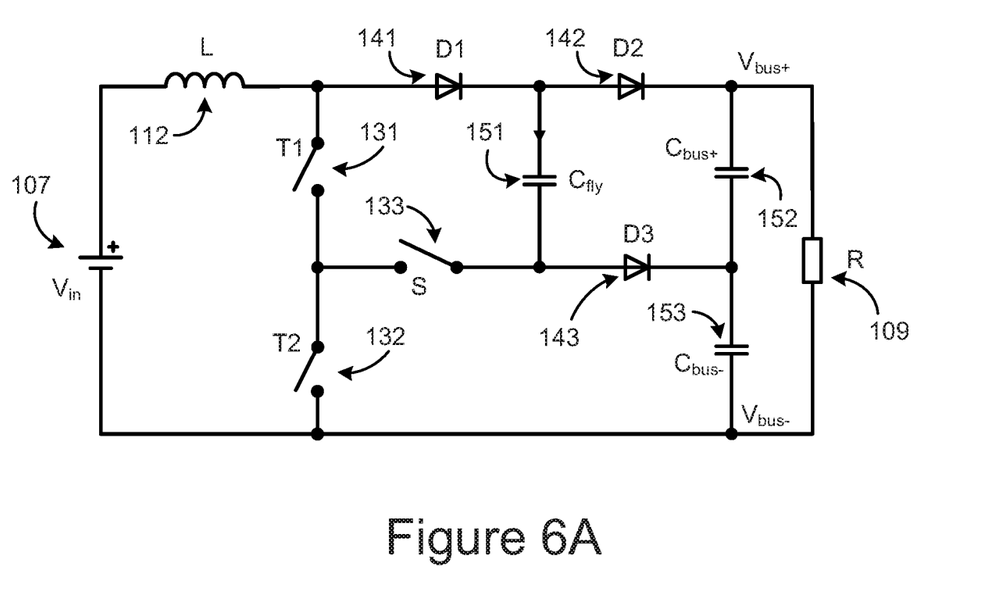
FIG. 6A presents another embodiment for a multi-level boost converter circuit.

FIG. 6A presents another embodiment for a multi-level boost converter circuit 100 that be incorporated into the DC to DC conversions system of FIG. 2B. In this example, an input voltage source Vin 107 is again connected between ground (or, more generally, the lower bus voltage level $V_{bus-}$) and the boost inductor L 112. The boost inductor L 112 is connected to the output node at upper bus voltage level $V_{bus+}$ through a pair of series connected diodes D1 141 and D2 142 oriented to allow current to flow from the inductor L 112 to the $V_{bus+}$ node. Relative to the embodiment of FIG. 2A, the path parallel to D1 141, D2 142 through D4 in not included in FIG. 6A. A load is represented at R 109 and is connected between $V_{bus+}$ and $V_{bus-}$. For example, the input voltage can be a photovoltaic converter at 200V and $V_{bus+}$ and $V_{bus-}$ the high and ground lines of a power grid at 480V.

Aside from lacking D4 144, the other elements of FIG. 6A are arranged similarly to is FIG. 2A for the shown embodiment. A flying capacitor $C_{fly}$ 151 has one plate connected to a node between the diodes D1 141 and D2 142 and its second plate connected to an internal node X. The internal node X is connected on the one side between the capacitors $C_{bus+}$ 152 and $C_{bus-}$ 153, and on the other side between the switches T1 131 and T2 132. The capacitors $C_{bus+}$ 152 and $C_{bus-}$ 153 are connected in series between $V_{bus+}$ and $V_{bus-}$ to form a capacitive voltage divider. In one set of embodiments, capacitors $C_{bus+}$ 152 and $C_{bus-}$ 153 are taken to have the same capacitance so that the level on the node between capacitors $C_{bus+}$ 152 and $C_{bus-}$ 153 will be at ½ $V_{bus+}$.

In FIG. 6A, the bridge circuit is again formed of switches T1 131 and T2 132 connected between the boost inductor L 112 and the series diodes D1 141, D2 142 on the one side and ground on the other side, and can be used to generate a multi-level waveform on the node X when the switch S 133 is closed. Switch S 133 can again be opened in a pre-charging. Depending on the embodiment, the switches T1 131, T2 132 and S 133 can be implemented as a metal-oxide-semiconductor field-effect transistor (MOSFET), insulated-gate bipolar transistor (IGBT), bipolar junction transistor (bipolar transistor or BJT) or other active controlled power semiconductor. For example, FIG. 2E illustrates a high voltage NMOS device and FIG. 2F illustrates a high voltage IGBT, as can be used for T1 131, T2 132 and S 133, where the shown diode is the device's inherent body diode, rather than a separate element. The control voltage for the device $V_T$ is applied to the control gate of the device and corresponds to $V_{T1}$, $V_{T2}$ and $V_S$ for the respective cases of T1 131, T2 132 and S 133.

The operation of a system using the embodiment of FIG. 6A can again be as described with respect to FIGS. 2B-2D. When switch T1 131 is on (closed) and switch T2 132 is off (open), the node X will be at $V_{in}$; where switch T1 131 is off (open) and switch T2 132 is on (closed), the node X will be at ground; and when both switches T1 131 and T2 132 are off, the node X will be at ½ $V_{bus+}$. This results in a multi-level waveform on the node X. The switches T1 131 and T2 132 have non-overlapping control waveforms so that the switches T1 131 and T2 132 are not both on at the same time.

Figure 6B:
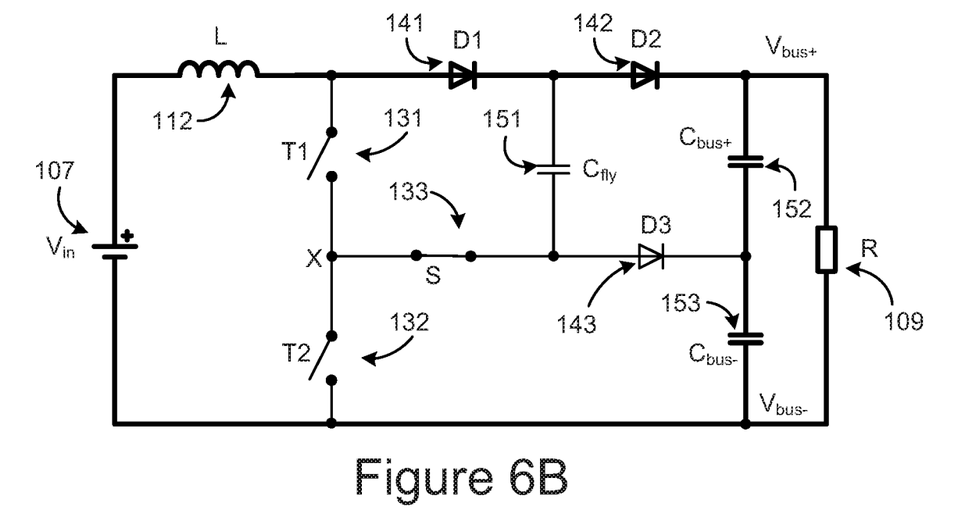
FIGS. 6B-6D correspond to respective FIGS. 3B, 4B, and 5, but for the embodiment of FIG. 6A, rather than for the embodiment of FIG. 3A.

FIG. 2D again illustrates a set of waveforms for the DC to DC conversion system 2B with the multi-state boost converter of FIG. 6A. During phases a and c, the circuit of FIG. 6A will be as illustrated in FIGS. 3A and 3C respectively, but with the path though D4 144 removed. In phases b and d, however, as the D4 path in no longer available, the primary path between the boost inductor L 112 and the $V_{bus+}$ node will now be through the diode pair D1 141, D2 142, as illustrated in FIG. 6B by the heavier line weight on this path.

The embodiment of the multi-level boost converter of FIG. 6A again includes the diode D3 143, through which the bottom plate of the Cfly 151 at node X is connected to the intermediate node of the capacitive voltage divider of $C_{bus+}$ 152 and $C_{bus-}$ 153. As with the embodiment of FIG. 2A, this can help to prevent voltage surges at $V_{bus+}$ being transmitted to $C_{fly}$ 151. For example, if $V_{bus+}$ and $V_{bus-}$ are the high and low lines of a power grid, D3 143 can help prevent such power surges from being transmitted back to the boost converter 100 and causing damage to its components. When switch T1 131 is closed and switch T2 132 is open, the situation for the embodiment of FIG. 6A is as described above with respect to FIG. 4A, but with the path through D4 144 omitted.

Figure 6C:
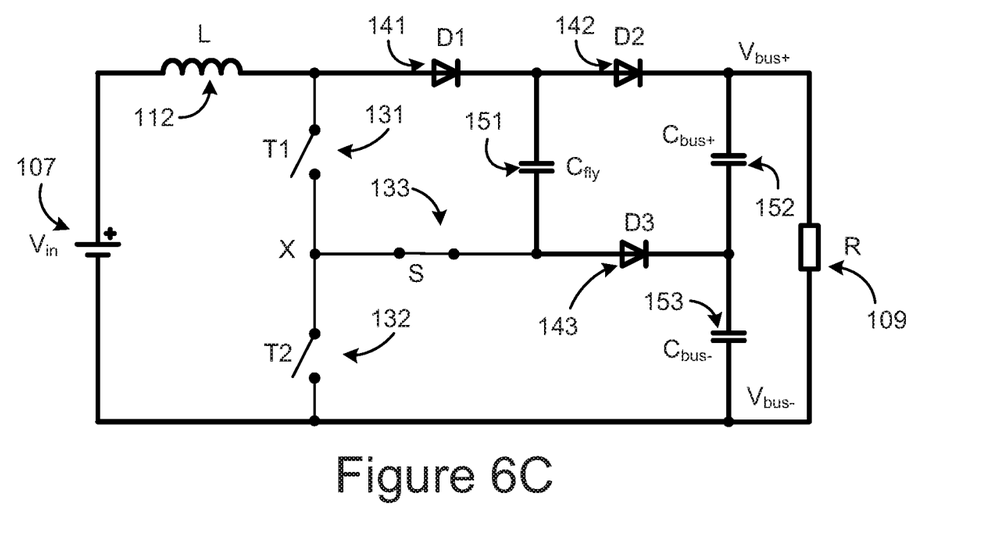

FIG. 6C illustrates the multi-state boost converter of FIG. 6A configured as in phases b and d of FIG. 2D, with both T1 131 and T2 132 open. The diode D3 143 again keeps any spike from the node X, which is clamped at ½$V_{bus+}$ for the regulated value of $V_{bus+}$. The diodes D1 141 and D2 142 prevent any sharp increases at $V_{bus+}$ from feeding back along the path from $V_{bus+}$ to L 122. Consequently, the inclusion of D3 143 can provide a very reliable solution for abnormal grid interactions.

Figure 6D:
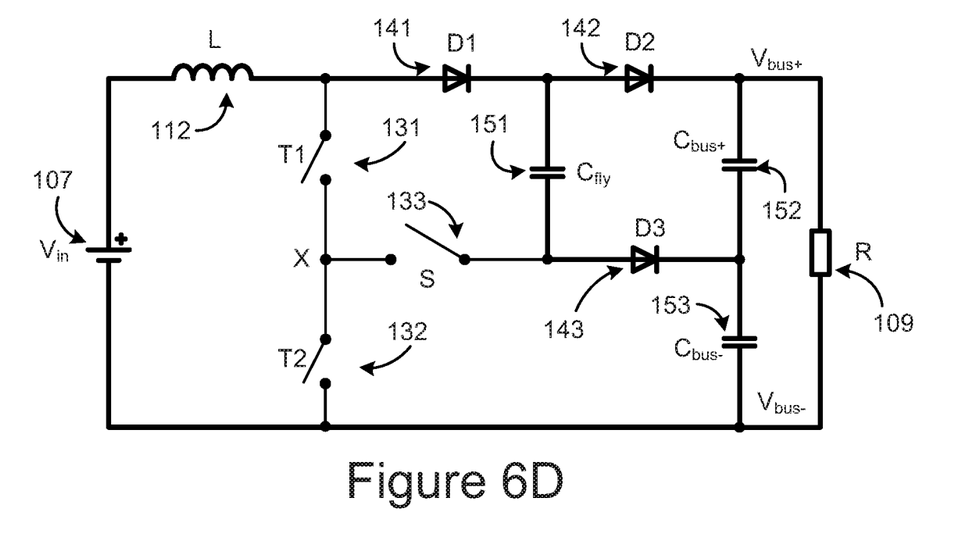

FIG. 6D illustrates the multi-state boost converter configured for a pre-charge operation for the embodiment of FIG. 6A, corresponding to FIG. 5 for the embodiment of FIG. 2A. The pre-charge phase can last for a few milliseconds, for example, to initialize the circuit before beginning normal operation. Switch S 133 as well as switches T1 131 and T2 132 are open. This allows current to flow through the boost inductor L 112 through D1 141 and on to the top plate of $C_{fly}$ 151 setting it at Vin and pulling up the node X. Current can also flow through D1 141 and D2 142 to the output node, initializing the voltage divider of $C_{bus+}$ 152 and $C_{bus-}$ 153. This allows for circuit of FIG. 6A to be pre-charged without the cost and complexity of special pre-charging elements.

Figure 7:
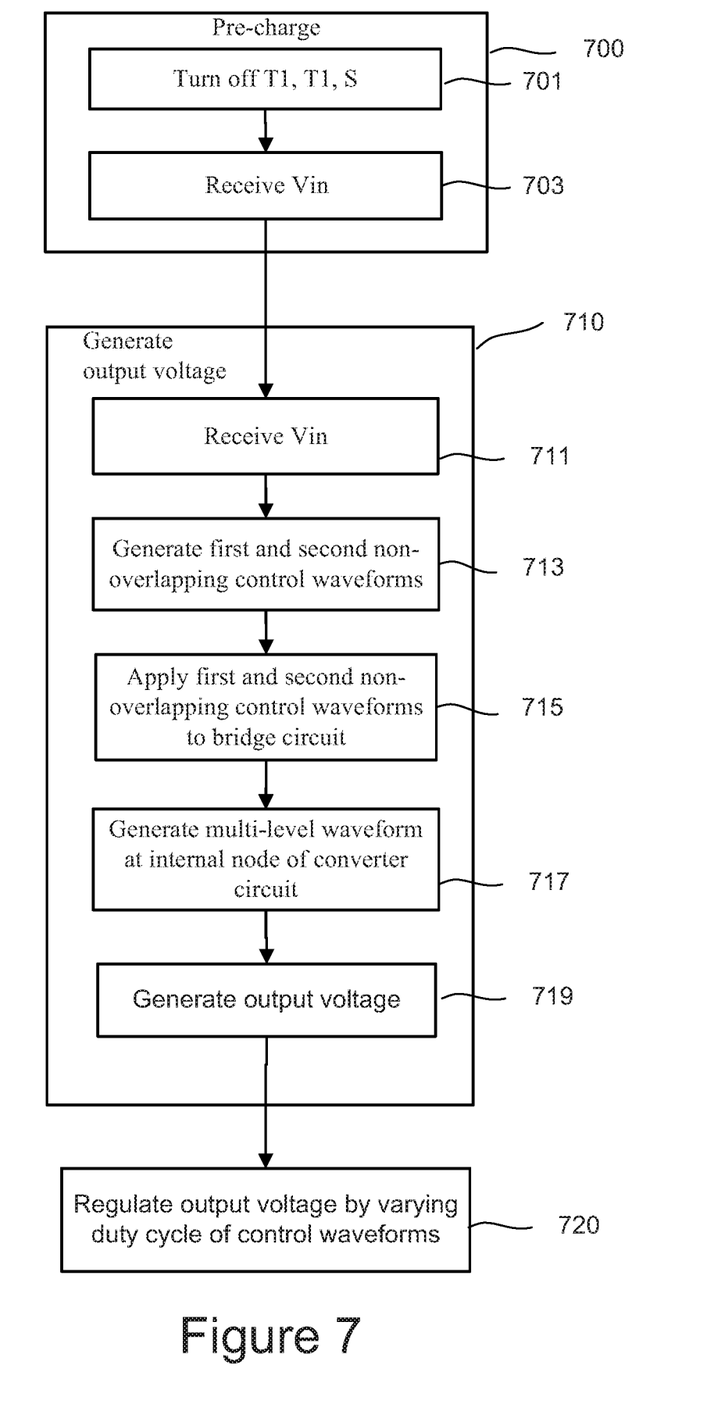
FIG. 7 is a flow illustrating the operation of the multi-level boost converter of FIG. 2A or FIG. 6A.

FIG. 7 is flow illustrating the operation of the system of FIGS. 2B-2F for the embodiments using either of FIG. 2A or 6A as the DC to DC converter. Beginning with a pre-charge phase at 700. As illustrated in FIG. 5, the switches T1 131, T2 132 and S 133 are turned off (open) at 701 and the circuit is pre-charged by the input voltage Vin at 703. Once pre-charged, the switch S 133 is turned on (closed) and the output voltage is then generated at 710.

Generating the output voltage $V_{bus+}$ at 710 includes receiving the input DC voltage Vin at 711. The control circuity of block 190 generates the control waves forms for the bridge circuit at 713. For embodiments such as the bridge circuit of switches T1 131 and T2 132, an example is the first and second non-overlapping waveforms $V_{T1}$ and $V_{T2}$ as illustrated in the top two traces of FIG. 2D. These are then applied to the bridge circuit of T1 131 and T2 132 at 715, generating the multi-level waveform on node X of FIG. 2A or FIG. 6A at 717. Applying the multi-level waveform on node X in turn generates the output voltage $V_{bus+}$ at 719.

While generating the output voltage $V_{bus+}$ at 710, the control circuitry 190 can regulate the output voltage at 720. Embodiments can regulate the output by varying the duty cycle of the control waveforms, the period of the control waveforms, or a combination of these. In the embodiment of FIG. 7, the output voltage is regulated by varying the duty cycle of the control waveforms at step 720. The control circuitry 190 can receive the output voltage $V_{bus+}$ and can also receive the input voltage to Vin. Based on these levels, the control circuitry 190 can vary the duty cycle (and/or the period) of the control signals to the bridge to regulate the value of $V_{bus+}$ or the ratio of $V_{bus+}$/Vin. The regulated value can be set by user input, where this can be manual or automatic, and the control circuitry can be implemented through hardware, software, firmware, or some combination of these.

The embodiments present above consequently present a topology and operation/control strategy for a DC to DC conversion system using a boost converter. The embodiments increase efficiency though use of the multi-level operation, protect the components from abnormal conditions by only subjecting the components to low stress in such situations, and provide an easy solution of pre-charging of the topologies flying capacitor.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. A DC to DC voltage converter, comprising:
an input voltage node configured to receive an input voltage;
an output voltage node configured to provide an output voltage;
an inductor connected between the input voltage node and the output voltage node;
first and second diodes connected in series between the inductor and the output voltage node and configured to allow current to flow from the inductor to the output voltage node;
a first capacitor having a first plate and a second plate, the first plate connected to a node between the first and second diodes, and the second plate connected to an internal node;
a third diode connected between the internal node and an intermediate voltage node and configured to allow current to flow from the internal node to the intermediate voltage node;
a first switch connected between the internal node and a node between the inductor and the first and second diodes;
a second switch connected between the internal node and ground, the first and second switches configured to generate a multi-level waveform on the internal node; and
a third switch through which the second plate of the first capacitor is connected to the internal node.

2. The DC to DC converter of claim 1, further comprising:
a fourth diode connected in parallel with first and second diodes between the inductor and the output voltage node, configured to allow current to flow from the inductor to the output voltage node.

3. The DC to DC converter of claim 1, further comprising:
a second capacitor connected between the output voltage node and the intermediate voltage node; and
a third capacitor connected between the intermediate voltage node and ground.

4. The DC to DC converter of claim 1, wherein the first and second switches are NMOS transistors.

5. The DC to DC converter of claim 1, further comprising:
a control circuit configured to provide first and second non-overlapping control waveforms to the first and second switches, respectively.

6. The DC to DC converter of claim 5, wherein the control circuit is further configured receive the output voltage and vary a duty cycle of the first and second control waveforms to regulate a level of the output voltage.

7. The DC to DC converter of claim 5, wherein:
the control circuit is configured to turn the third switch on while concurrently providing the first and second non-overlapping control waveforms to the first and second switches.

8. The DC to DC converter of claim 7, wherein the control circuit is further configured to perform a pre-charge operation that includes concurrently turning off the first, second and third switches.

9. A DC to DC voltage conversion system, comprising:
a DC to DC conversion circuit, comprising:
an inductor connected between an input node and an output node;
first and second diodes connected in series between the inductor and the output node, configured to allow current to flow from the inductor to the output node;
a bridge circuit connected between a node connecting the inductor to the first and second diodes and ground, the bridge circuit configured to generate a multi-level waveform on an internal node;
a capacitor having a first plate and a second plate, the first plate connected to a node between the first and second diodes and the second plate connected to the internal node;
a third diode connected between the internal node and an intermediate voltage node configured to allow current to flow from the internal node to the intermediate voltage node; and
a first switch through which the second plate of the capacitor is connected to the internal node; and
a control circuit connected to the bridge circuit, the control circuit configured to supply the bridge circuit first and second non-overlapping control waveforms whereby an output voltage is generated at the output node from an input voltage at the input node, wherein the control circuit configured to turn the first switch on while concurrently providing the first and second non-overlapping control waveforms to the bridge circuit.

10. The DC to DC voltage conversion system of claim 9, wherein the bridge circuit includes:
a second switch connected between the internal node and the node connecting the inductor to the first and second diodes and configured to receive the first control waveform; and
a third switch connected between the internal node and ground and configured to receive the second control waveform.

11. The DC to DC voltage conversion system of claim 10, wherein the control circuit is further configured to perform a pre-charge operation that includes concurrently turning off the first, second and third switches.

12. The DC to DC voltage conversion system of claim 10, wherein the control circuit configured to turn the first switch on while concurrently providing the first and second non-overlapping control waveforms to the second and third switches.

13. The DC to DC voltage conversion system of claim 9, the DC to DC conversion circuit further comprising:
a fourth diode connected in parallel with first and second diodes between the inductor and the output node, configured to allow current to flow from the inductor to the output node.

14. The DC to DC voltage conversion system of claim 9, wherein the control circuit is further configured receive the output voltage and vary a duty cycle of the first and second control waveforms to regulate the level of the output voltage.

15. The DC to DC voltage conversion system of claim 9, wherein the control circuit is further configured to perform a pre-charge operation that includes turning off the first switch.

16. A method, comprising:
receiving an input voltage at an input node;
generating from the input voltage an output voltage at an output node, generating the output voltage comprising:
generating first and second non-overlapping control waveforms;
applying the first and second non-overlapping waveforms to a bridge circuit; and
generating by the bridge circuit from the first and second non-overlapping waveforms of a multi-state waveform at an internal node of a DC to DC voltage converter, the DC to DC voltage converter including:
an inductor connected between the input node and the output node;
first and second diodes connected in series between the inductor and the output node, configured to allow current to flow from the inductor to the output node;
a first capacitor having a first plate and a second plate, the first plate connected to a node between the first and second diodes and the second plate connected to the internal node
a third diode connected between the internal node and an intermediate voltage node, configured to allow current to flow from the internal node to the intermediate voltage node; and
a first switch through which the second plate of the first capacitor is connected to the internal node,
wherein the bridge circuit is connected between a node connecting the inductor to the first and second diodes and ground,
the method further comprising:
prior to generating the output voltage at the output node, performing a pre-charge operation, the pre-charge operation including:
receiving the input voltage at the input node while setting the first switch off.

17. The method of claim 16, wherein generating the output voltage at the output node further includes:
varying a duty cycle of the first and second non-overlapping control waveforms to regulate the output voltage.

18. The method of claim 16, wherein the bridge circuit includes:
a second switch connected between the internal node and the node connecting the inductor to the first and second diodes, configured to receive the first control waveform; and
a third switch connected between the internal node and ground, configured to receive the second control waveform.

19. The method of claim 18, wherein the pre-charge operation further includes:
receiving the input voltage at the input node while setting the second and third switches off.

20. The method of claim 16, wherein generating the output voltage at the output node further includes setting the first switch on.

* * * * *